(12) United States Patent
Munafo et al.

(10) Patent No.: US 8,137,725 B2
(45) Date of Patent: Mar. 20, 2012

(54) ORGANOLEPTICALLY ENHANCED WHITE CHOCOLATE

(75) Inventors: John P. Munafo, Hackettstown, NJ (US); Mark S. Mackey, Hackettstown, NJ (US)

(73) Assignee: Mars, Incorporated, McLean, VA (US)

( * ) Notice: Subject to any disclaimer, the term of this patent is extended or adjusted under 35 U.S.C. 154(b) by 152 days.

(21) Appl. No.: 12/688,700

(22) Filed: Jan. 15, 2010

(65) Prior Publication Data

US 2010/0183791 A1    Jul. 22, 2010

Related U.S. Application Data

(60) Provisional application No. 61/145,502, filed on Jan. 16, 2009.

(51) Int. Cl.
    A23L 1/22      (2006.01)
    A23L 2/56      (2006.01)
(52) U.S. Cl. .......... 426/534; 426/584; 426/593
(58) Field of Classification Search .......... 426/534
    See application file for complete search history.

(56) References Cited

U.S. PATENT DOCUMENTS

| | | | |
|---|---|---|---|
| 3,881,025 A | | 4/1975 | Flament .......... 426/537 |
| 5,360,621 A | * | 11/1994 | Mentink et al. .......... 426/548 |
| 5,925,399 A | * | 7/1999 | Cheng et al. .......... 426/631 |
| 2003/0129276 A1 | | 7/2003 | Hansen et al. .......... 426/45 |

FOREIGN PATENT DOCUMENTS

| | | |
|---|---|---|
| EP | 0 821 055 A2 | 1/1998 |
| EP | 1 308 094 A2 | 5/2003 |
| JP | 2008-263903 | 11/2008 |
| RU | 885 873 A1 | 11/1981 |
| WO | 03/037099 | 5/2003 |
| WO | 2005/074700 | 8/2005 |

OTHER PUBLICATIONS

Federal Register, "Federal Register Final Rule—67 FR 6217 Oct. 4, 2002: White Chocolate; Establishment of a Standard of Identity," U.S. Food and Drug Administration (FDA), pp. 1-11.*
Hofberger et al. "Chocolate and Cocoa" in Handbook of Food Products Manufacturing, Eds. Chandan et al., 2007, p. 682.*
G.A. Burdock, Ed. Fenaroli's Handbook of Flavor Ingredients, vol. II, 3rd Edition pp. 424, CRC Press, (1995).

* cited by examiner

Primary Examiner — Elizabeth Gwartney
(74) Attorney, Agent, or Firm — Fitzpatrick, Cella, Harper & Scinto

(57) ABSTRACT

This invention is directed to an enhanced white chocolate to which has been added isovaleric acid in an amount effective to provide enhanced organoleptic attributes compared to a conventional white chocolate. The invention is also directed to the preparation of the enhanced white chocolate.

20 Claims, 1 Drawing Sheet

ORGANOLEPTICALLY ENHANCED WHITE CHOCOLATE

This application claims the benefit of U.S. Provisional Application No. 61/145,502, filed Jan. 16, 2009, which is incorporated by reference.

BACKGROUND OF THE INVENTION

1. Field of the Invention

This invention is directed to a white chocolate having enhanced organoleptic attributes. The invention is also directed to the method of making the organoleptically enhanced white chocolate.

2. Related Background Art

White chocolate is a well known confection typically made with cocoa butter, sugar and milk solids, that is substantially free of nonfat cocoa solids.

In 2002, the U.S. Food and Drug Administration (USFDA) established a standard of identity (SOI) for white chocolate, which became effective on Jan. 1, 2004. 67FR62171. In accordance with this standard, an SOI white chocolate contains not less than 20% by weight cacao fat, i.e., cocoa butter, not less than 14% by weight of total milk solids and not less than 3.5% by weight milkfat. In addition, SOI white chocolate in the U.S. cannot contain more than 55% by weight of nutritive carbohydrate sweetener.

In Europe, white chocolate is similarly defined with the exception that there is no limit on the content of nutritive carbohydrate sweetener. See Directive 2000/36/EC (Jun. 23, 2000). The standard of identity for white chocolate in Canada is set forth in Canadian Food and Drug Regulations, C.R.C., c.870, Section B.04.009, pp. 218-219. The standard of identity for chocolate in Australia is set forth in Australia New Zealand Food Standards Code, Chapter 1, Standard 1.1.2— Supplementary Definitions for Foods, which applies to any product named "chocolate," including white chocolate. Because of the absence of nonfat cocoa solids, the flavor attributes of SOI white chocolate are quite different than chocolates comprising nonfat cocoa solids such as milk and dark chocolates.

White chocolate-like products are also made that are substantially free of nonfat cocoa solids but that do not meet a standard of identity for white chocolate. These products are often referred to as non-standard of identity (non-SOI) white chocolates, and are known in the art by such names as white compound coating and white confectionery coating. Such non-SOI white chocolates typically comprise other vegetable-derived fats and/or oils in addition to or as a replacement for cocoa butter or milkfat. For example, they may contain palm oil, coconut oil, partially hydrogenated palm kernel oil, and other such components. They may also comprise other sweeteners in addition to or as a replacement for nutritive carbohydrate sweeteners. In addition, they may contain colors, flavors, and other ingredients that may not be permitted in a white chocolate according to the requirements of a standard of identity.

As in the case of SOI white chocolates, the absence of nonfat cocoa solids makes the flavor of non-SOI white chocolates quite different than chocolates comprising nonfat cocoa solids. Furthermore, the alternative and additional ingredients used in non-SOI white chocolate compositions have a significant impact on their flavor and textural attributes compared to SOI white chocolates.

Both SOI and non-SOI white chocolates share the general characteristics of comprising a dairy or dairy-derived component and a sweetener in a fat continuous system and being substantially free of nonfat cocoa solids. Such compositions based on dairy or dairy-derived components and sweeteners in a fat system pose significant challenges when attempting to modify particular flavor and/or textural attributes. These attributes may include a lack of richness and roundedness in flavor and the presence of oxidized and stale off-notes. The flavors of dairy, sweetener, and fat components will be more prominent when no nonfat cocoa solids are present in the composition. Consequently, any undesired attributes of the components will likely be more noticeable in the finished product. The compositions may also have a waxy or fatty mouthfeel rather than a smooth, silky feeling in the mouth during consumption.

Consumers, however, expect and desire certain organoleptic properties in a confection that is described as a white chocolate. Therefore, it would be highly desirable if the organoleptic properties of white chocolate, whether an SOI white chocolate or a non SOI white chocolate, could be modified to provide a white chocolate having an improved flavor and/or improved mouth feel.

International Publication No. WO 03/037099 is directed to a process to manipulate the flavor of chocolate by adding non-cocoa and/or milk/dairy flavor attributes to a chocolate mass. The publication states that dark, milk or white chocolate may be modified. The described process appears to rely on flavor generation from the reaction of flavor precursors selected from proline, ornithine and protein hydrolysate with any of rhamnose, fructose or sucrose. There is, however, no mention or suggestion of employing isovaleric acid to enhance the organoleptic properties of white chocolate.

SUMMARY OF THE INVENTION

The present invention is directed to an organoleptically enhanced white chocolate comprising a dairy or dairy-derived component and a sweetener in a fat continuous system that is substantially free of nonfat cocoa solids and contains isovaleric acid in an amount of about 500 to about 1600 parts per billion (ppb). As used herein, "white chocolate" means an SOI or non-SOI white chocolate.

In a preferred embodiment, the organoleptically enhanced white chocolate will comprise: (a) not less than about 20% by weight cocoa butter; (b) not less than about 3.5% by weight milkfat; (c) not less than about 14% by weight total milk solids, (d) at least one sweetener; and (e) isovaleric acid in an amount of about 500 to about 1600 parts per billion (ppb). Most preferably, the white chocolate will be an SOI white chocolate according to the standard of identity for white chocolate in the United States.

Yet another embodiment of the invention is directed to a method of producing the organoleptically enhanced white chocolate of the invention by addition of isovaleric acid during the preparation of a white chocolate or to a prepared white chocolate to provide improved flavor and/or mouthfeel.

DETAILED DESCRIPTION OF THE INVENTION

Definitions

Figure 1:
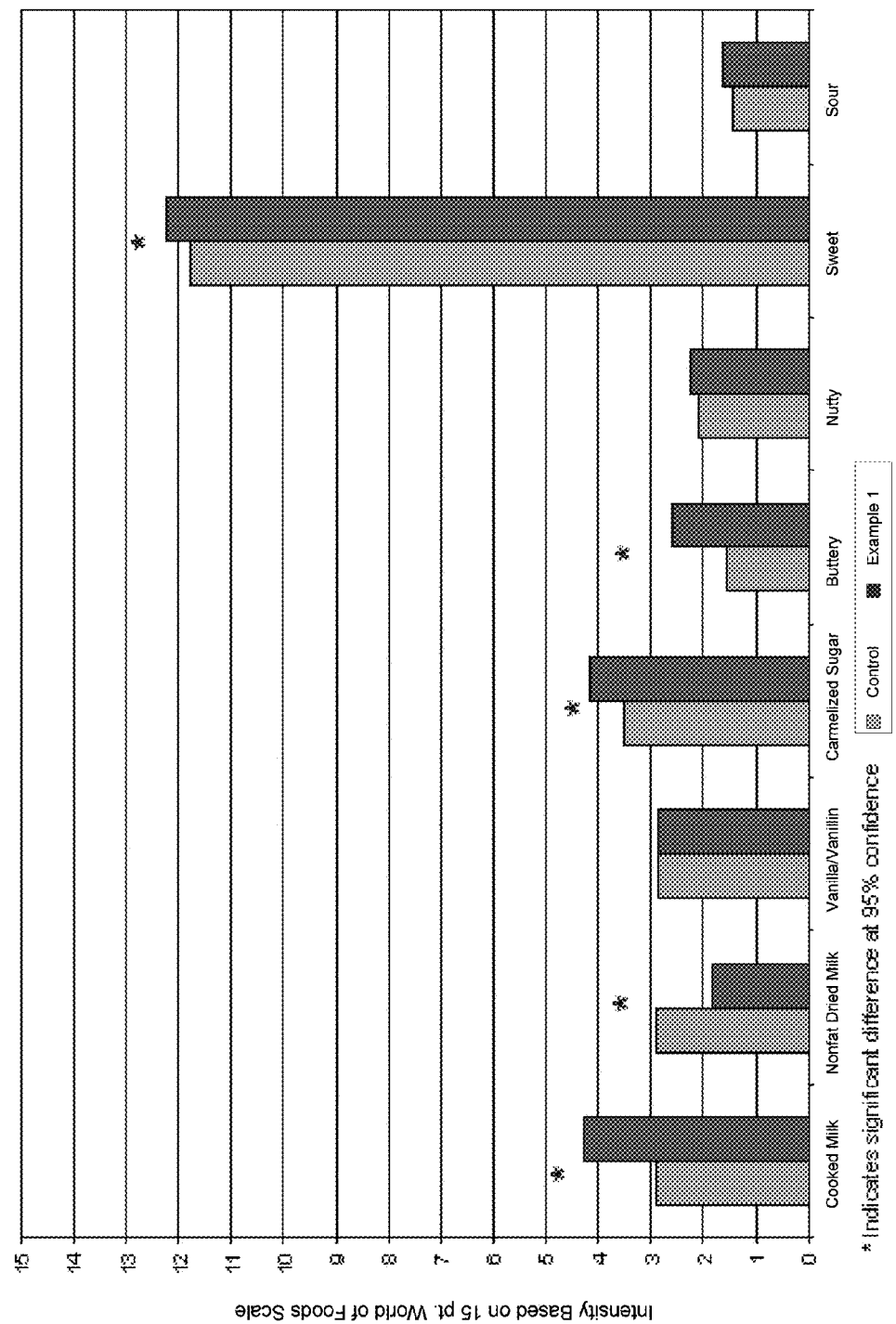
FIG. 1 illustrates the descriptive flavor analysis profile of a white chocolate of this invention compared to a conventional white chocolate.

For the purposes of this application, a "standard of identity" or "SOI" for an edible product refers to a standard established by a regulatory agency of a government or a recognized standards organization, that lays out the requirements for an edible product to be called by a specific name, where the standard may include requirements on allowed and non-allowed ingredients, minimum and maximum percentages of ingredients, processing parameters, and other stipulations.

A "standard of identity chocolate" or "SOI chocolate" refers to a chocolate that meets the requirements of a standard established by a regulatory agency of a government or a recognized standards organization in effect at the time of this application for an edible product to be called "chocolate." In addition, standards of identity may be established for various types of chocolate, for example, white chocolate, milk chocolate, or dark chocolate. Therefore, one skilled in the art would readily understand the meaning of the term, "standard of identity white chocolate" or "SOI white chocolate." A white chocolate specified as meeting the United States standard of identity meets the requirements established in 21 C.F.R. §163.124 in effect as of the filing date of this application, which is incorporated by reference.

On the other hand, a "non-standard of identity chocolate" or "non-SOI chocolate" refers to a chocolate-like product that does not meet the requirements of a standard established by a regulatory agency of a government or a recognized standards organization for an edible product to be called "chocolate." In addition, one skilled in the art would readily understand that the use of the modifier, "non-standard of identity," before the name of any type of chocolate, for example, white chocolate, milk chocolate, or dark chocolate, describes a chocolate-like product that does not meet the requirements of an established standard of identity for the indicated type of chocolate. In particular, for the present application, a "non-standard of identity white chocolate" or "non-SOI white chocolate" refers to a white chocolate-like product that does not meet the requirements of an established standard of identity for "white chocolate." Non-standard of identity white chocolates include white chocolate-like products known in the art by such names as white compound coating and white confectionery coating.

Notwithstanding the above definitions, the term "white chocolate" in the present application is intended to encompass all white chocolates and white chocolate-like products, whether they meet the requirements of an established standard of identity for "white chocolate" or not, unless expressly stated otherwise, or unless it is clear from the context that a more limited definition is intended.

The phrase, "substantially free of nonfat cocoa solids," when used to describe the white chocolate and white chocolate-like products of the present invention, means that nonfat cocoa solids are excluded from the product to the greatest extent possible. Practically speaking, it may be difficult to completely exclude nonfat cocoa solids in a manufacturing environment, but the product should preferably contain less than 0.5% by weight nonfat cocoa solids, and more preferably, no more than a trace quantity of nonfat cocoa solids. Potential sources of nonfat cocoa solids include cacao beans or nibs, chocolate liquor, cocoa butter, cocoa powder, finished chocolate, and other materials derived from cacao beans.

The term, "flavor," as used herein, follows the definition of Fennema, that is, "an overall integrated perception of all the contributing senses (smell, taste, sight, feeling, and sound) at the time of food consumption." ("Food Chemistry, $2^{nd}$ Edition, Revised and Expanded," Owen R. Fennema, editor; Marcel Dekker, Inc.; New York, N.Y.; 1985.) However, the term, "mouthfeel," is also used to specifically describe the sensation of feeling in the mouth during consumption of a food.

"Organoleptically enhanced," when used to describe the white chocolate and white chocolate-like products of the present invention, means that the organoleptic properties, or properties sensed during food consumption, are changed in a way that is preferred by the consumer over conventional white chocolate and white chocolate-like products.

A "dairy or dairy-derived component" is a milk (mammalian) or a product derived from milk, in any convenient form, e.g., a liquid or a dry powder. Examples of dairy or dairy-derived components are provided in the specification.

A "fat continuous system" is a food system in which a continuous fat or oil matrix surrounds the other components of the food system which are distributed throughout the fat or oil matrix.

"Substantially free of free water," when used to describe the white chocolate and white chocolate-like products of the present invention, means that free or unbound water is excluded from the product to the greatest extent possible. Practically speaking, it may be difficult to completely exclude free water in a manufacturing environment, but the product should preferably contain less than 3% free water, and more preferably, less than 1% free water. Potential sources of free water include fresh dairy ingredients such as milk and cream, and other ingredients containing residual water. Free water and unbound water are synonymous.

DISCLOSURE OF THE PREFERRED EMBODIMENTS

It has surprisingly been discovered that the addition of isovaleric acid to a white chocolate can enhance the organoleptic properties of the white chocolate. In particular, it has been found that white chocolate to which isovaleric acid has been added is likely to be perceived as having a reduced waxy/fatty mouthfeel, a reduction in oxidized and stale flavor attributes and a more complex rounded flavor, i.e., overall better flavor compared to a white chocolate not having isovaleric acid added thereto.

The amount of added isovaleric acid generally will be sufficient to ensure that the total amount of isovaleric acid present in the organoleptically enhanced white chocolate is not less than about 500 ppb, preferably not less than about 550 ppb, more preferably not less than about 600 ppb and most preferably not less than about 700 ppb. Generally, the amount of isovaleric acid in the organoleptically enhanced white chocolate will not exceed about 1600 ppb, preferably not exceed about 1200 ppb, more preferably not exceed about 1000 ppb and most preferably not exceed about 900 ppb. The amount of isovaleric acid in the white chocolate of this invention, therefore, will generally range from about 500 to about 1600 ppb, preferably from about 550 ppb to about 1200 ppb, more preferably from about 600 ppb to about 1000 ppb, and most preferably from about 700 ppb to about 900 ppb. The isovaleric acid (3-methylbutanoic acid) used in the present invention is described by the following formula:

$(CH_3)_2$—CH—$CH_2$—COOH          isovaleric acid

The isovaleric acid may be added to the white chocolate in many different ways. For example, it may be added to one or more of the ingredients used to manufacture the white chocolate, it may be added during the formulation of the white chocolate, it may be added to the white chocolate immediately after it has been formulated or at a later time. It may be preferable to mix the isovaleric acid used herein with a small amount of a white chocolate ingredient, such as cocoa butter, or a suitable carrier, prior to its addition to the white chocolate.

Isovaleric acid has been described as having unpleasant, rancid, sour and/or sweaty flavor attributes, even at threshold concentrations in water or oil. In fact, in the field of sensory science, isovaleric acid is used as a reference for demonstrating the flavor characteristic of "dirty socks" to panelists performing descriptive analysis of food products (ASTM DS66, "Aroma and Flavor Lexicon for Sensory Evaluation: Terms, Definitions, References, and Examples," Gail Vance Civille and Brenda G. Lyon, Eds.; American Society for Testing and Materials, West Conshohocken, Pa., 1996, page 86). Thus, the discovery that isovaleric acid could be used to enhance the organoleptic attributes of white chocolate was very surprising and unexpected. Moreover, compounds of highly similar structure, such as valeric acid (pentanoic acid), butyric acid (butanoic acid) and isobutyric acid (2-methylpropanoic acid) were found to impart undesirable organoleptic attributes, i.e., a cheesy, sour milk or rancid character, when added to white chocolate. Thus, the advantageous results of this invention were clearly unexpected.

Conventional white chocolate contains a very small amount of endogenous isovaleric acid. For example, typically white chocolate may have about 70 to 75 ppb of endogenous isovaleric acid. Endogenous butyric acid is also present in conventional white chocolate. Typically, about 450 to 460 ppb of butyric acid may be found in a conventional white chocolate.

Accordingly, without being bound to theory, it is believed that the enhanced organoleptic properties of the white chocolate of the present invention may be defined by the weight ratio of isovaleric acid to butyric acid in the white chocolate. Thus, yet another embodiment of this invention is directed to a white chocolate having an isovaleric acid to butyric acid weight ratio in a range of at least about 1.3, preferably at least about 1.4, more preferably at least about 1.5, and most preferably at least about 1.7. The upper limit of the isovaleric acid to butyric acid weight ratio is preferably no more than about 3.7, preferably no more than about 2.8, more preferably no more than about 2.4, and most preferably no more than about 2.2. Thus, the ratio of isovaleric acid to butyric acid in the organoleptically enhanced white chocolate is generally in a range of about 1.3 to about 3.7, preferably in a range of about 1.4 to about 2.8, more preferably in a range of about 1.5 to about 2.4, and most preferably in a range of about 1.7 to about 2.2.

In the broadest sense of this invention, white chocolate comprises a dairy or dairy-derived component and a sweetener in a fat continuous system, and is substantially free of nonfat cocoa solids. Thus, "white chocolate" means SOI white chocolate and non-SOI white chocolate. Examples of non-SOI white chocolates result when the nutritive carbohydrate sweetener is replaced partially or completely; or when the cocoa butter or milkfat are replaced partially or completely; or when components that have flavors that imitate milk, butter or chocolate are added; or when other additions or deletions in formula are made outside the USFDA standard of identity of white chocolate; or combinations thereof.

The fat or oil in the fat continuous system may be selected from the group consisting of cocoa butter, cocoa butter equivalents, cocoa butter improvers, cocoa butter substitutes, cocoa butter replacers, cocoa butter extenders and vegetable fats other than cocoa butter, such as palm kernel, palm, illipe, sal, shea, kokum gurgi, mango kernel, coconut and mixtures thereof. An exemplary SOI chocolate would be one formulated with cocoa butter, whereas a non-SOI white chocolate would be one formulated with a cocoa butter equivalent. However, in all cases the white chocolate of this invention will be substantially free of nonfat cocoa solids, i.e., containing less than 0.5% by weight nonfat cocoa solids, and more preferably, no more than a trace quantity of nonfat cocoa solids.

In a preferred embodiment, the white chocolate of this invention contains not less than about 20% by weight cocoa butter, as required by the U.S. standard of identity for white chocolate. Typically, the amount of cocoa butter present will be in a range of about 20% to about 60% by weight of the white chocolate, preferably about 20% to about 50% by weight of the white chocolate, and most preferably about 20% to about 40% by weight of the white chocolate.

In the context of a non-SOI white chocolate, it may be more convenient to refer to the total fat content, rather than specified fat ingredients such as cocoa butter or milkfat. The total fat content of a non-SOI white chocolate according to the invention may be in a range of 15% by weight to 60% by weight, preferably 20% by weight to 55% by weight. Compositions at the low end of the stated total fat content range for non-SOI white chocolate might be utilized in a formed/extruded chip solid, whereas compositions at the high end of the range might be suitable to form thin coating material on an ice cream bar.

The white chocolate of this invention contains a dairy or dairy-derived component. The dairy or dairy-derived component may be from any dairy source in any form (e.g., a liquid or a dry powder), such as for example, cream, milkfat, butter, milk, dry whole milk, concentrated milk, evaporated milk, sweetened condensed milk, skim milk, concentrated skim milk, evaporated skim milk, sweetened condensed skim milk, nonfat dry milk, concentrated buttermilk, dried buttermilk, malted milk, anhydrous milkfat, whey, whey protein isolate or concentrate, casein, demineralized whey, caseinates, milk isolates, and the like.

In a preferred embodiment, the white chocolate of this invention contains not less than about 5% by weight, more preferably not less than 10% by weight, and most preferably not less than 14% by weight total milk solids, where total milk solids is the total dry weight of the dairy or dairy-derived component(s) in the white chocolate. In preferred embodiments, the amount of total milk solids used in the white chocolate of this invention will be in a range of about 14% to about 50% by weight of the white chocolate, preferably about 14% to about 40% by weight of the white chocolate, and most preferably about 14% to about 30% by weight of the white chocolate. In the case where the white chocolate is non-SOI white chocolate, the amount of total milk solids used is in the range of about 5% to about 50% by weight, preferably in the range of about 10% to about 40% by weight. The preferred milk solids may be skim milk solids and/or whole milk solids.

Generally, a white chocolate of this invention will contain from 0% by weight up to about 30% by weight, preferably up to about 25% by weight, and more preferably up to about 20% by weight milkfat. SOI white chocolate according to the invention contains not less than about 3.5% by weight milkfat. Therefore, preferably, the amount of milkfat used in the white chocolate of this invention will be in a range of about 3.5% to about 30% by weight of the white chocolate, more preferably about 3.5% to about 25% by weight of the white chocolate, and most preferably about 3.5% to about 20% by weight of the white chocolate. The milkfat may be contributed by any of the many well known milkfat-containing dairy ingredients or as a milkfat ingredient alone, for example, anhydrous milkfat.

The white chocolate according to the invention contains a sweetener, which in non-SOI white chocolate need not be a nutritive carbohydrate sweetener, and may comprise a non-nutritive sweetener. The sweetener may be in an amorphous or crystalline form.

In a preferred embodiment, the white chocolate of this invention may contain at least one nutritive carbohydrate sweetener. Nutritive carbohydrate sweeteners with varying degrees of sweetness intensity are useful in the present invention and may be any of those typically used in the art and include, but are not limited to, sucrose, (e.g. from cane or beet), dextrose, fructose, lactose, maltose, glucose syrup solids, corn syrup solids, invert sugar, hydrolyzed lactose, honey, maple sugar, brown sugar, molasses and the like. Liquid sucrose, corn syrup, and other amorphous sweeteners may also be used. The nutritive carbohydrate sweetener, preferably sucrose, will be present in the white chocolate as suspended crystals or particles. Preferably, the white chocolate contains a nutritive carbohydrate sweetener, and most preferably that sweetener is sucrose. When present, the nutritive carbohydrate sweetener is generally in an amount from about 0.5% to about 70% by weight of the white chocolate, preferably about 5.0% to about 55% by weight of the white chocolate, and most preferably about 5.0% to about 50% by weight of the white chocolate. In one preferred embodiment, the nutritive carbohydrate sweetener will not exceed about 55% by weight of the white chocolate.

The white chocolate may also contain bulking agents. The term "bulking agents" as defined herein may be any of those typically used in the art and include polydextrose, polyfructose (inulin), other oligosaccharides, cellulose and its derivatives, maltodextrin, gum arabic, starches and modified food starches, and the like. In an alternative embodiment of the present invention, a bulking agent may partially replace the sweetener.

The white chocolate may contain a sugar replacer. The term "sugar replacer" includes sugar alcohols (polyols), or high potency sweeteners or combinations thereof. In an alternative embodiment of the present invention, a sugar replacer may partially replace the sweetener. The high potency sweeteners include aspartame, neotame, cyclamates, saccharin, acesulfame potassium, neohesperidin dihydrochalcone, sucralose, alitame, stevia sweeteners, glycyrrhizin, thaumatin and the like and mixtures thereof. The preferred high potency sweeteners are aspartame, cyclamates, saccharin, and acesulfame potassium. Examples of sugar alcohols may be any of those typically used in the art and include sorbitol, mannitol, xylitol, maltitol, isomalt, lactitol and the like.

The white chocolate of this invention may also contain other optional ingredients, such as emulsifiers. Examples of safe and suitable emulsifiers may be any of those typically used in the art or having GRAS ("Generally Recognized as Safe") status, and include lecithin derived from vegetable sources such as soybean, safflower, corn, etc., fractionated lecithins enriched in either phosphatidyl choline or phosphatidyl ethanolamine or both, mono- and digylcerides, diacetyl tartaric acid esters of mono- and diglycerides (also referred to as DATEM), monosodium phosphate derivatives of mono- and diglycerides of edible fats or oils, sorbitan monostearate, hydroxylated lecithin, lactylated fatty acid esters of glycerol and propylene glycol, polyglycerol esters of fatty acids (e.g., polyglycerol ricinoleate (PGPR)), propylene glycol mono- and diester of fats and fatty acids, or any emulsifier that may become approved for the USFDA-defined soft candy category. In addition, other emulsifiers that can be used in the present invention, include polyglycerol polyricinoleate, ammonium salts of phosphatidic acid, sucrose esters, oat extract, any emulsifier found to be suitable in chocolate or a similar fat/solid system, or any blend of these. Emulsifiers preferred for use in the present invention are lecithin, fractionated lecithin, diacetyl tartaric acid esters of mono- and diglycerides (DATEM) or mixtures of these emulsifiers. A particularly preferred emulsifier is lecithin. Typically, emulsifier may be incorporated in the enhanced white chocolate in an amount of about 0% to about 2.5% by weight, subject to local regulations and achievement of the desired functionality. For white chocolate meeting the requirements of the U.S. standard of identity, it is preferred to incorporate a maximum level of 1.5% by weight of any one emulsifier or mixture of emulsifiers.

The white chocolate of this invention will be substantially free of free, or unbound, water, i.e., less than 3% by weight free water, preferably less than 1% by weight free water. In a preferred embodiment, the white chocolate of this invention is a solid at room temperature, i.e., 25° C., but will exist in a melted state at body temperature, i.e., 37° C.

The manufacture of white chocolate is well known and the white chocolate of the invention may be prepared using the known techniques. In addition, the white chocolate may be prepared using known techniques to make compound coatings and confectionery coatings.

In the method of the present invention, the isovaleric acid may be added during the formulation of the white chocolate or after the white chocolate is formulated. It may be added neat or preferably is mixed with a small amount of a carrier, such as cocoa butter, vegetable oil, propylene glycol, glycerol, triacetin, or other known carrier, prior to its addition.

Compounded flavors (mixtures of flavoring substances) may also contain isovaleric acid, and the invention covers white chocolate with isovaleric acid added as a component of a compounded flavor, as long as the isovaleric acid level in the final chocolate product is in the range of about 500 ppb to about 1600 ppb.

The white chocolate prepared by the process of this invention exhibits the organoleptically enhanced characteristics of reduced waxy/fatty mouthfeel, reduced oxidized and stale flavor attributes and a more complex rounded flavor, as these sensory descriptors are understood in the art.

It should be clear that the white chocolate of this invention will not contain components in amounts that would deleteriously affect the enhanced organoleptic attributes of the inventive white chocolate, e.g., by introducing cheesy, sour milk, rancid and/or other unpleasant character attributes, or by masking desired flavor attributes of the white chocolate, and thus alter the nature of the invention.

Inventive Example 1

The commercially available SOI white chocolate used as the starting material in these examples, and used as a control in the taste testing described below, contained sugar, cocoa butter, whole milk powder, milkfat, soy lecithin (an emulsifier), salt and vanilla in the conventional proportions, with a total fat content of about 33% by weight. 363 mg of isovaleric acid was mixed with 500 grams of melted cocoa butter and the mixture was poured into a mold and allowed to cool so as to form a solid block. 454 kgs of a commercially available white chocolate was melted and the solid block of cocoa butter containing the isovaleric acid was added thereto and mixed therewith. The white chocolate containing the added isovaleric acid was tempered, deposited into molds, and allowed to cool. An analytical evaluation revealed that the white chocolate had an isovaleric acid concentration level of approximately 800 ppb. A sensory evaluation showed that this white chocolate having the isovaleric acid added thereto exhibited reduced waxy mouth feel, less oxidized flavor attributes and overall improved flavor compared to a control sample of the commercially available white chocolate.

Inventive Examples 2-5

Individual amounts of isovaleric acid were added to 0.5 grams of vegetable oil carrier so that the addition of each mixture to 500 grams of a commercially available melted white chocolate targeted an addition of about 400 ppb, 1200 ppb, 1400 ppb and 1600 ppb, respectively. Sensory evaluations showed that, although there were variations in the flavor attributes among the chocolate samples, the white chocolates having the isovaleric acid added thereto all exhibited reduced waxy mouthfeel, less oxidized flavor attributes and overall improved flavor compared to a control sample of the commercially available white chocolate.

Comparative Example 1

An amount of butyric acid was added to 0.5 grams of vegetable oil carrier so that the addition of the mixture to 500 grams of melted commercially available white chocolate targeted an addition of 800 ppb of butyric acid. Sensory evaluation of the resulting composition showed the composition had a sour milk attribute and the organoleptic attributes of the white chocolate were not enhanced.

Comparative Example 2

It was determined that the commercially available white chocolate of Comparative Example 1 contained about 458 ppb of endogenous butyric acid. Butyric acid in a vegetable oil carrier was then added to the commercially available white chocolate of Comparative Example 1 to bring the level of butyric acid to about 800 ppb in the finished white chocolate. Sensory evaluation of the resulting composition revealed that the composition had an unpleasant sour milk-like attribute and the organoleptic attributes of the white chocolate were not enhanced.

Comparative Example 3

An amount of isobutyric acid was added to 0.5 grams of vegetable oil carrier so that the addition of the mixture to 500 grams of melted commercially available white chocolate targeted an addition of 800 ppb of isobutyric acid. Sensory evaluation of the resulting composition showed the composition had a rancid character and the organoleptic attributes of the white chocolate were not enhanced.

Comparative Examples 4-7

An amount of valeric acid was added to 0.5 grams of vegetable oil carrier so that the addition of the mixture to 500 grams of melted commercially available white chocolate targeted an addition of 600 ppb of valeric acid. Compositions were also prepared in a similar manner, targeting the addition of 700 ppb, 800 ppb and 900 ppb valeric acid. Sensory evaluation of the resulting compositions revealed that the compositions had a sharp cheese-like character and the organoleptic attributes of the white chocolate were not enhanced.

Comparative Example 8

A white chocolate composition was prepared by adding amounts of valeric acid and isovaleric acid in a vegetable oil carrier to melted commercially available white chocolate to target the addition of 400 ppb valeric acid and 400 ppb isovaleric acid to the commercially available white chocolate. Sensory evaluation of the resulting composition revealed that the composition had a sharp cheese-like character that was not present when isovaleric acid was added alone.

Taste Testing of White Chocolate

The white chocolate of Example 1 was compared in a blind study to commercially available white chocolate (control) using a group of 60 taste testers. The control was given to 50% of the participants first and the white chocolate of this invention second, while the other 50% of the participants received the white chocolate of Example 1 first and the control second.

The participants were asked to rate the white chocolate using the following questionnaire:

---

White Chocolate Taste Test

---

You received two white chocolate samples labeled with three-digit random codes.
It's important that you taste them in the order indicated in the instructions.
Take a drink of water before you begin.
 1. Generally do you like white chocolate?
Please taste sample XXX and answer the following question.
 2. How much do you LIKE or DISLIKE this product OVERALL?
    Check One ____ Like extremely
    ____ Like very much
    ____ Like slightly
    ____ Neither like nor dislike
    ____ Dislike slightly
    ____ Dislike very much
    ____ Dislike extremely
Take a drink of water to cleanse your palate.
Now, taste sample YYY and answer the following question.
 3. How much do you LIKE or DISLIKE this product OVERALL?
    Check One ____ Like extremely
    ____ Like very much
    ____ Like slightly
    ____ Neither like nor dislike
    ____ Dislike slightly
    ____ Dislike very much
    ____ Dislike extremely
 4. Of the two samples you tasted today, which one did you like the best?
    Check One ____ the 1$^{st}$ sample I tasted (XXX)
    ____ the 2$^{nd}$ sample I tasted (YYY)
 5. What specifically did you like about the sample you preferred?
    Please write a description with as much detail as possible.
    _____
    _____
    _____

Thank you for your participation!

Test Results

The results for questions 2 and 3 are set forth in Table 1 below.

TABLE 1

| Ranking | Inventive Example 1 | Control |
|---|---|---|
| Like extremely | 9 | 4 |
| Like very much | 34 | 16 |
| Like slightly | 15 | 22 |
| Neither like or dislike | — | 6 |
| Dislike slightly | 2 | 11 |
| Dislike very much | — | 1 |
| Dislike extremely | — | — |

These results, indicating degree of liking, show a strong preference for the white chocolate of this invention. The results for question 4 are set forth in Table 2 below.

TABLE 2

| White Chocolate | # Preferred | % Preferred |
|---|---|---|
| Inventive Example 1 | 49 | 81.7 |
| Control | 11 | 18.3 |

These results show a significant overall preference for the white chocolate of Inventive Example 1 containing about 800 ppb of isovaleric acid.

A similar taste test with a second group of 60 taste testers was performed using the organoleptically enhanced white chocolate of Inventive Example 1 and the commercially available white chocolate as a control. The participants were provided with a white chocolate of the invention and the control in the same manner as in the previous example.

A second questionnaire, adapted to gauge perception of "waxy mouthfeel," was prepared as follows:

---

White Chocolate Taste Test

You received two white chocolate samples labeled with three-digit random codes.
It's important that you taste them in the order indicated in the instructions.
Take a drink of water before you begin.
  1. Generally do you like white chocolate?
Please taste sample XXX. Take a drink of water to cleanse your palate.
Now, taste sample YYY and answer the following question.
  2. Of the two samples you tasted today, which one had a LESS waxy mouthfeel?
        Check One ____ the 1st sample I tasted (XXX)
        ____ the 2nd sample I tasted (YYY)
  3. Of the two samples you tasted today, which one did you like the best?
        Check One ____ the 1st sample I tasted (XXX)
        ____ the 2nd sample I tasted (YYY)
  4. What specifically did you like about the sample you preferred?
     Please write a description with as much detail as possible.
     _____
     _____
     _____
     _____

Thank you for your participation!

---

Test Results

The results for question 2 in the second questionnaire are set forth in Table 3 below.

TABLE 3

| White Chocolate | # indicating "Less Waxy Mouthfeel" | % indicating "Less Waxy Mouthfeel" |
|---|---|---|
| Inventive Example 1 | 42 | 70 |
| Control | 18 | 30 |

The results in Table 3 show that the enhanced white chocolate of Inventive Example 1 containing about 800 ppb of isovaleric acid was generally perceived to have a less waxy mouthful than the control white chocolate.

Descriptive Flavor Analysis

The white chocolate composition of this invention (Inventive Example 1) and the commercially available white chocolate (control) were evaluated by descriptive flavor analysis, as performed by a trained panel of nine members. The samples were evaluated one at a time (monadic) using the Sensory Spectrum Descriptive Analysis Method and quantified on a 0-15 "world of food" intensity scale. (The Sensory Spectrum Descriptive Analysis Method is described in detail in the following reference book: Sensory Evaluation Techniques, 3rd Edition, Morten Meilgaard, D. Sc., Gail Vance Civille, B. S. & B. Thomas Carr, M. S., CRC Press LLC, Boca Raton, Fla., 1999.) The flavor attributes evaluated were cooked milk, nonfat dried milk, vanilla/vanillin, caramelized sugar, buttery, nutty, sweet and sour. Significant differences within an attribute were noted at $p \leq 0.05$ (statistical significance).

The test results, which are illustrated in FIG. 1, showed that the inventive white chocolate composition was significantly higher in cooked milk, caramelized sugar, buttery and sweet flavor attributes, which are generally considered to be desirable attributes for a white chocolate by those skilled in the art. The test results also showed that the inventive white chocolate was significantly lower in the nonfat dried milk flavor attribute. Thus, it appears that the addition of isovaleric acid to white chocolate decreases the nonfat dried milk flavor attribute, which is often used in the art to describe the negative attribute of a stale note associated with older or aged chocolates.

Inventive Example 6

A commercially available white compound coating was used as the starting material in the following example. The white compound coating contained sugar, partially hydrogenated palm kernel oil, nonfat milk powder, soy lecithin (an emulsifier), salt and artificial flavor in the conventional proportions, with a total fat content of about 26% by weight. An amount of isovaleric acid was added to 0.5 grams of vegetable oil carrier so that the addition of the mixture to 500 grams of melted commercially available white compound coating targeted an addition of 800 ppb of isovaleric acid. A sensory evaluation showed that this white compound coating having the isovaleric acid added thereto exhibited reduced waxy mouthfeel, less oxidized flavor attributes, and overall improved flavor compared to a control sample of commercially available white compound coating.

What is claimed is:

1. An organoleptically enhanced white chocolate comprising: a dairy or dairy-derived component and a sweetener in a fat continuous system, wherein the white chocolate is substantially free of nonfat cocoa solids and contains isovaleric acid in an amount of about 500 ppb to about 1600 ppb.

2. The organoleptically enhanced white chocolate of claim 1, comprising:
    (a) not less than about 20% by weight cocoa butter;
    (b) not less than about 3.5% by weight milkfat;
    (c) not less than about 14% by weight total milk solids;
    (d) at least one sweetener; and
    (e) isovaleric acid in an amount of about 500 ppb to about 1600 ppb.

3. The organoleptically enhanced white chocolate of claim 1 or 2, comprising endogenous butyric acid, wherein the weight ratio of isovaleric acid to butyric acid is in a range of about 1.3 to about 3.7.

4. The organoleptically enhanced white chocolate of claim 2, wherein the sweetener is a nutritive carbohydrate sweetener present in a range of about 0.5% to about 70% by weight.

5. The organoleptically enhanced white chocolate of claim 2, wherein the white chocolate comprises cocoa butter in an amount of about 20% to about 60% by weight.

6. The organoleptically enhanced white chocolate of claim 2, wherein the white chocolate comprises total milk solids in an amount of about 14% to about 50% by weight.

7. The organoleptically enhanced white chocolate of claim 2, wherein the white chocolate comprises milkfat in an amount of about 3.5% to about 30% by weight.

8. The organoleptically enhanced white chocolate of claim 4, wherein the nutritive carbohydrate sweetener is present in an amount of not more than about 55% by weight.

9. The organoleptically enhanced white chocolate of claim 4, wherein the nutritive carbohydrate sweetener is sucrose.

10. The organoleptically enhanced white chocolate of claim 1, comprising about 15% by weight to about 60% by weight of a vegetable-derived fat or oil other than cocoa butter.

11. The organoleptically enhanced white chocolate of claim 1, wherein the white chocolate meets the U.S. standard of identity for white chocolate.

12. A method of preparing an organoleptically enhanced white chocolate comprising the step of:
adding (i) to a white chocolate or (ii) during the formulation of a white chocolate, sufficient isovaleric acid to obtain about 500 ppb to about 1600 ppb of isovaleric acid in the organoleptically enhanced white chocolate, wherein the organoleptically enhanced white chocolate is substantially free of nonfat cocoa solids.

13. The method according to claim 12, wherein the organoleptically enhanced white chocolate comprises: (a) not less than about 20% by weight cocoa butter; (b) not less than about 3.5% by weight milkfat; (c) not less than about 14% by weight total milk solids; (d) at least one sweetener; and (e) isovaleric acid in an amount of about 500 ppb to about 1600 ppb.

14. The method according to claim 12 or 13, wherein the organoleptically enhanced white chocolate also comprises butyric acid, wherein the weight ratio of isovaleric acid to butyric acid in the organoleptically enhanced white chocolate is in a range of about 1.3 to about 3.7.

15. The method according to claim 12 or 13, wherein the isovaleric acid is added during the formulation of the white chocolate.

16. The method according to claim 12 or 13, wherein the isovaleric acid is added to melted white chocolate.

17. The method according to claim 12 or 13, wherein the isovaleric acid is mixed with cocoa butter prior to the step of addition.

18. The method according to claim 13, wherein the organoleptically enhanced white chocolate comprises a nutritive carbohydrate sweetener present in a range of about 0.5% to about 70% by weight.

19. The method according to claim 12, wherein the organoleptically enhanced white chocolate comprises about 15% by weight to about 60% by weight of a vegetable-derived fat or oil other than cocoa butter.

20. The method of claim 12, wherein the organoleptically enhanced white chocolate meets the U.S. standard of identity for white chocolate.

* * * * *